(12) United States Patent
Hansen et al.

(10) Patent No.: US 9,871,396 B2
(45) Date of Patent: Jan. 16, 2018

(54) SYSTEM AND METHOD FOR CONTROLLING CHARGE OF AN ENERGY STORAGE DEVICE FROM A RENEWABLE ENERGY SOURCE

(71) Applicant: General Electric Company, Schenectady, NY (US)

(72) Inventors: Lukas Mercer Hansen, Niskayuna, NY (US); Richard Scott Bourgeois, Albany, NY (US)

(73) Assignee: General Electric Company, Schenectady, NY (US)

( * ) Notice: Subject to any disclaimer, the term of this patent is extended or adjusted under 35 U.S.C. 154(b) by 99 days.

(21) Appl. No.: 15/188,014

(22) Filed: Jun. 21, 2016

(65) Prior Publication Data

US 2017/0366014 A1    Dec. 21, 2017

(51) Int. Cl.
*H02J 7/00* (2006.01)
*H02J 7/35* (2006.01)

(52) U.S. Cl.
CPC ............ *H02J 7/007* (2013.01); *H02J 7/0029* (2013.01); *H02J 7/355* (2013.01)

(58) Field of Classification Search
CPC ........... H02J 7/007; H02J 7/0029; H02J 7/355
See application file for complete search history.

(56) References Cited

U.S. PATENT DOCUMENTS

| | | | |
|---|---|---|---|
| 8,941,263 B2 | 1/2015 | Lee | |
| 9,020,649 B2 | 4/2015 | Sharma et al. | |
| 9,401,611 B2 * | 7/2016 | Guillou | ................. H02J 7/0027 |
| 2015/0084778 A1 * | 3/2015 | Mittal | .............. G01R 19/16542 |
| | | | 340/636.16 |
| 2016/0226287 A1 * | 8/2016 | Djan-Sampson | .... G05B 19/041 |

* cited by examiner

*Primary Examiner* — Vuthe Siek

(74) *Attorney, Agent, or Firm* — Dority & Manning, P.A.

(57) ABSTRACT

Systems and methods for controlling the charge of an energy storage device include determining an estimated energy production prediction for an energy source from a present time to a target time by which an energy storage device is desired to reach a top of charge (TOC) energy level when being charged by the energy source. An available amount of energy for storage at the energy storage device if the energy storage device is charged from the energy source at a first charge rate from the present time until the target time is determined. A present charge rate for the energy storage device is controlled to be the first charge rate when the available amount of energy is less than the energy storage capacity of the energy storage device and to be a second charge rate less than the first charge rate when otherwise.

20 Claims, 3 Drawing Sheets

SYSTEM AND METHOD FOR CONTROLLING CHARGE OF AN ENERGY STORAGE DEVICE FROM A RENEWABLE ENERGY SOURCE

FIELD OF THE INVENTION

The present subject matter relates generally to energy storage devices.

BACKGROUND OF THE INVENTION

Energy storage systems have become increasingly used to deliver power to utility grids either as part of standalone energy storage systems or as part of a renewable energy source (e.g. wind generation or solar generation systems) with an integrated energy storage system. Energy storage systems also can be used in other applications than utility grids, such as but not limited to telecommunications, electric vehicles, electronic devices, and other applications. Energy storage systems can include one or more battery banks or other energy storage devices.

When using energy storage devices such as batteries in the above applications and others, control systems for monitoring and enhancing battery capacity can be useful. Some systems are known to balance and monitor batteries with respect to their states of charge. The state of charge (SOC) of a battery, as used herein, is generally defined as the percentage of the full capacity of a battery that is still available for further discharge.

Specific factors relative to SOC are known to contribute to the overall capacity and life expectancy of batteries. For example, Lithium-based batteries can degrade at a faster rate when at or near top of charge (TOC). The potential for faster levels of battery degradation can also exist when batteries are consistently charged or discharged at faster rates.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a method for controlling the charge of an energy storage device, e.g., a battery, is disclosed. The method can include determining an estimated energy production prediction for an energy source, e.g., a renewable energy source such as a solar energy source, a wind energy source, etc., from a present time to a target time. The target time is a time by which an energy storage device is desired to reach a top of charge (TOC) energy level when being charged by the energy source. The method can include determining an available amount of energy for storage at the energy storage device if the energy storage device is charged from the energy source at a first charge rate from the present time until the target time. In some embodiments, the target time is before a planned dispatch time for the energy storage device and is selected to limit the total time between the target time and dispatch time during which the energy storage device remains at the top of charge (TOC) energy level. By limiting the time at which an energy storage device remains at TOC, degradation of the energy storage device can be reduced and useful life expectancy can be extended.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
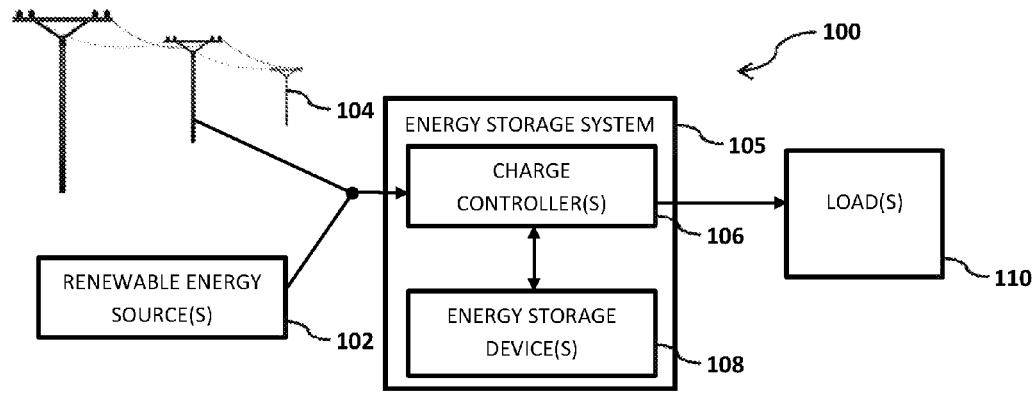
FIG. 1 provides a block diagram depicting an example embodiment of a power generation system according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to a systems and methods for controlling an energy storage device, e.g. a battery, by controlling charge rates and/or charge start times. Controlling these charge features can effectively limit an amount of time that an energy storage device spends at a top of charge (TOC) energy level. When possible, charge rates also can be controlled to limit the rates at which an energy storage device is charged and discharged.

More specifically, a system and method can be configured to determine an estimated energy production prediction for a renewable energy source (e.g., a wind energy source, a solar energy source, etc.) from a present time to a target time defined as the time by which an energy storage device (e.g., a battery such as a lithium-based battery or other type) is configured to reach a top of charge (TOC) energy level when being charged by the energy source. An available amount of energy for storage at the energy storage device can be determined by considering when the energy storage device is charged from the energy source at a first charge rate (e.g., a rated maximum charge rate for the energy storage system) from the present time until the target time. The available amount of energy can be compared to an energy storage capacity of the energy storage device. When the available amount of energy is less than the energy storage capacity of the energy storage device, a present charge rate for the energy storage device can be controlled to be the first charge rate. When the available amount of energy is greater than the energy storage capacity of the energy storage device, a present charge rate for the energy storage device can be controlled to be a second charge rate that is less than the first charge rate.

Example aspects of the present disclosure can provide many advantages. For example, known energy storage devices are often configured to charge as soon as excess renewable energy is available at the rate of available power until the energy storage device reaches a top of charge (TOC) energy level. Once a device reaches TOC, the device would rest idle until a dispatch time. The renewable energy source may still be producing power at the point when the energy storage device reaches TOC, but will have to curtail that power because there is no more capacity in the energy storage device. By controlling a charge start time and charge rate in such systems, an amount of time that an energy storage device spends at a top of charge (TOC) as well as unnecessarily fast rates of charge can be controlled in a manner that reduces degradation of the energy storage device and extends overall useful life of the device. In addition, utilization of an energy storage device can be maintained in a manner that introduces the least necessary stress to an energy storage device.

Referring now to the figures, FIG. 1 illustrates one embodiment of an example power generation system 100 according to example aspects of the present disclosure. As shown, the power generation system 100 includes one or more renewable energy sources 102, a power grid 104, an energy storage system 105 and one or more loads 110. In some examples, the renewable energy source(s) 102 can include a wind energy source such as a farm of wind turbines. In other examples, the renewable energy source(s) 102 can include a solar energy source such as a bank of photovoltaic (PV) cells. Energy storage system 105 is provided to store excess energy generated by renewable energy source 102 that is not immediately needed at the power grid 104. Power stored within energy storage system 105 can be saved until times when power production at renewable energy source 102 has fallen or until times of peak power demand at power grid 104 when the excess energy stored within energy storage system 105 is more valuable to consumers.

Referring still to FIG. 1, energy storage system 105 can be an electrical energy storage (EES) system that includes one or more charge controllers 106 and one or more energy storage devices 108. Charge controller 106 can control various aspects of the energy storage system 105, including controlling the charging and discharging of the energy storage devices 108 with a charger. Further, charge controller 106 can include one or more control devices, such as sensors, controllers, processors, etc. that can monitor various aspects of the energy storage system 105. For example, charge controller 106 can monitor the individual current, charge rate, charge voltage, charge times, etc. for each of the energy storage devices 108 using one or more sensors.

Energy storage device(s) 108 can include one or more electrochemical cells, such as but not limited to a bank of batteries. Battery banks can be configured in a variety of manners including various arrangements of strings of cells in series to define a particular voltage level and combined strings of cells in parallel to define a particular energy capacity. The energy storage device(s) 108 can include at least one of a lithium ion battery, a sodium nickel chloride battery, a sodium sulfur battery, a nickel metal hydride battery, a nickel cadmium battery, a fuel cell, or any other suitable battery. Further, the energy storage device(s) 108 can be coupled to an inverter to convert DC power provided by the energy storage device(s) 108 to AC power for supply to power grid 104 or other AC application. In addition, the energy storage device(s) 108 may be used in telecommunications, grid, mobile, and/or any other suitable application.

Figure 2:
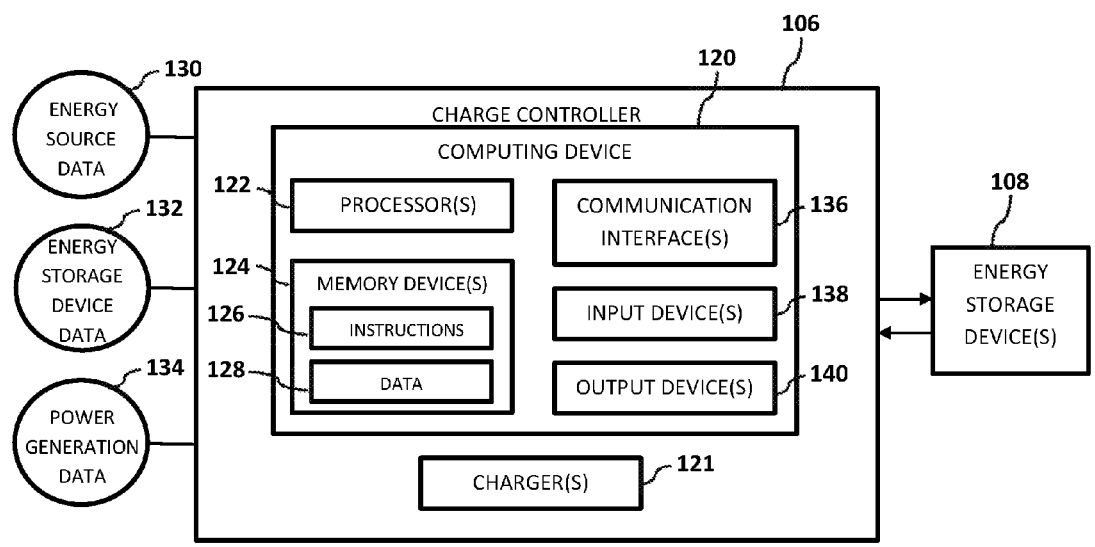
FIG. 2 provides a block diagram depicting an example embodiment of an energy storage system according to example embodiments of the present disclosure.

Referring to FIG. 2, an example charge controller 106 can include any number of control devices. As shown, for example, the controller 106 can include one or more computing device(s) 120 and one or more chargers 121 that operate in accordance with parameters defined by computing device(s) 120 to provide a charging output to periodically charge the energy storage device(s) 108. Charger(s) 121 can be coupled to energy storage device(s) 108 via one or more contactors, depending on the number and configuration of cells within energy storage device(s) 108.

Computing device(s) 120 can include one or more processor(s) 122 and associated memory device(s) 124 configured to perform a variety of computer-implemented functions and/or instructions (e.g., performing the methods, steps, calculations and the like and storing relevant data as disclosed herein). Instructions 126 when executed by the one or more processors 122 can cause the one or more processors 122 to perform operations, including providing control commands to the charger 121, the energy storage devices 108 and/or other aspects of the energy storage system 105 and/or power generation system 100.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The one or more processors 122 can also be configured to compute advanced control algorithms.

Additionally, the memory device(s) 124 can include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 124 can be configured generally to store suitable computer-readable instructions 126 that, when implemented by the processor(s) 122, configure the charge controller 120 to perform the various functions as described herein.

Memory device(s) 124 also can be configured to store data 128, such as but not limited to variables stored or calculated in accordance with the disclosed technology. For example, data 128 can include data from sources including but not limited to energy source data 130, energy storage device data 132, and power generation data 134. Energy source data can include historical profiles indicating likely estimates for energy production by renewable energy source(s) 102 at different times of day, different days/weeks/ months/seasons of year, weather conditions, etc. Energy storage device data 132 can include such information as a maximum rated charge rate for an energy storage device, a top of charge energy rate, a number of cycles within the effective useable lifetime of an energy storage device, etc. Power generation data 134 can include timing data such as but not limited to predetermined dispatch times for an energy storage device employed within an energy storage system and larger power generation system as well as simulated dispatch times determined based on historical data, system measurement (e.g., using models), etc.

Additionally, computing device 120 within charge controller 106 can also include a communications interface 136 to facilitate communications between the charge controller 106 and the various components of the energy storage system 105 and/or power generation system 100. Communications interface 136 can include a sensor interface (e.g., one or more analog-to-digital converters) to permit signals transmitted from one or more sensors to be converted into signals that can be understood and processed by the one or more processors 122. Communications interface 136 can be configured to accommodate a variety of different signal communication infrastructures and protocols, including wired and/or wireless connections or other signal transmission arrangements over one or more signal networks.

The computing device 120 can include various input/output devices for providing and receiving information to/from a user. For instance, an input device 138 can include devices such as a touch screen, touch pad, data entry keys, and/or a microphone suitable for voice recognition. Input device 138 can be employed by a user to provide manual entry of data 130/132/134, control parameters and the like. An output device 140 can include audio or visual outputs such as speakers or displays for indicating charging data, energy storage data and/or power generation data, user interfaces related to such information, and the like.

Charge controller 106 is configured to control the charge and discharge of energy storage device(s) 108 in terms of one or more charge parameters including but not limited to a charge rate, charge duration between a start time and target time corresponding to top of charge (TOC) energy level, and other parameters as disclosed herein. Specific definitions for these charge parameters are determined according to other variables, such as but not limited to estimated energy production predictions for renewable energy sources, an available amount of energy capacity at the energy storage device, etc. Example aspects pertaining to the determination of such variables and associated charge parameters and subsequent control of an energy storage device in accordance with such variables and charge parameters are discussed with reference to FIG. 3.

Figure 3:
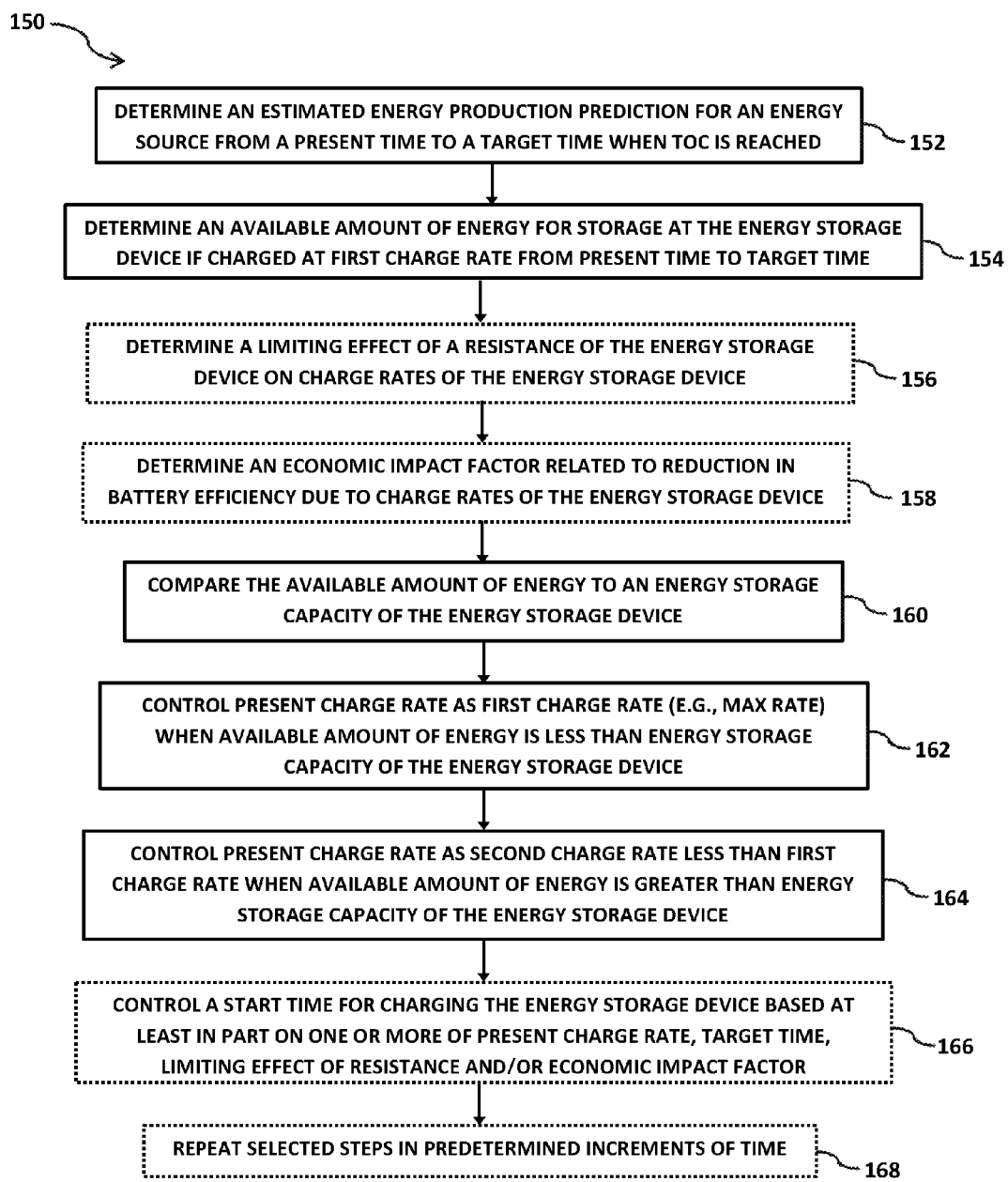
FIG. 3 provides a flow diagram depicting an example method for controlling charge in an energy storage system according to example embodiments of the present disclosure.

Referring now to FIG. 3, a flow diagram of a method 150 for controlling the charge of an energy storage device, e.g. a battery, by determining charge parameters (e.g., charge rates and times) while balancing one or more of a plurality of degradation factors is disclosed. Degradation factors can include, for example, the time spent at a top of charge (TOC) energy level, rates of charge and/or discharge, and economic impact associated with charging.

A target time (TT) as defined herein is a time at which an energy storage device 108 is desired to reach a top of charge (TOC) energy level when being charged by an energy source 102. The target time (TT) can also be defined as a time before a planned dispatch time (TD) for the energy storage device. The planned dispatch time can be a predetermined time or can be predicted based on historical data or simulations using digital models. A dispatch time (TD) generally corresponds to a time at which power is discharged from energy storage device and dispatched to power grid 104 or other application source. In accordance with some embodiments, the target time (TT) is selected to limit the total time between the target time (TT) and dispatch time (TD) during which the energy storage device remains at the top of charge (TOC) energy level.

With more specific reference to FIG. 3, method 150 can include at 152 determining an estimated energy production prediction (PP) for an energy source from a present time (TP) to a target time (TT). In some examples, the energy production prediction is determined as a number of kilowatt hours (kWh). The estimated energy production prediction (PP) can vary based on a number of factors related to the type of renewable energy source such as time of day and weather. Production predictions (PP) can be determined, for example, from energy source data 130 such as depicted in FIG. 2. Energy source data 130 can include historical data indicating likely estimates for different times of day, different seasons of the year, different weather patterns, production levels at immediately preceding intervals, and other factors.

Method 150 can further include determining at 154 an available amount (AA) of energy for storage in energy storage device 108 if the energy storage device is charged from the energy source at a first charge rate from the present time (TP) until the target time (TT). In some examples, the energy production prediction is determined as a number of kilowatt hours (kWh), and is based at least in part on the estimated energy production prediction (PP) determined at 152. In some examples, the first charge rate corresponds to a predetermined maximum charge rate for an energy storage system. Such a predetermined maximum charge rate can correspond to a rated maximum level established by the manufacturer of the energy storage device. In some examples, current limiters are included with the energy storage device to prevent charge rates for the energy storage device from exceeding the maximum rated charge rate levels. In some examples, the first charge rate could correspond to another predetermined charge rate other than the maximum rated level.

Additional factors can be optionally determined in some embodiments at 156 and 158. At 156, the method includes determining a limiting effect of a resistance on charge rates of the energy storage device 108. In some energy storage devices, device resistance will limit the charge rate at certain higher states of charge. By determining this limiting effect at 156, subsequent determinations of charge rates and start times can be more accurately calculated. This helps to ensure that a storage device does indeed reach a TOC energy level just before dispatch time. If limited charge rates due to device resistance are not accounted for, enhanced charge rates may be inaccurately calculated in a manner that prevents an energy storage device from reaching its full charge potential. The limiting effect of an energy storage device determined at 156 can thus be used at least in part to determine charge rates and charging start times that help prevent battery under-utilization.

At 158, the method includes determining an economic impact factor related to reduction in battery efficiency. The efficiency of the energy storage system is variable to the charge and discharge rates. As the total capacity of an energy storage device degrades over time, the efficiency of the battery is reduced. This reduction in battery efficiency directly correlates with a reduced amount of monetary potential the energy storage device offers to a power generation system. Since faster charge and discharge rates can cause an energy storage device to degrade at faster levels thus causing monetary impact on the overall system, selection of charge rates and charging start times optionally can be based at least in part on the economic impact factor determined at 158 in order to further balance degradation and efficiency factors.

Referring now to 160, the available amount (AA) of energy determined at 154 is compared to a storage capacity for energy storage device 108. The units of measure compared at 160 should be the same, for example, kilowatt-hour (kWh) values. When the available amount (AA) of energy determined at 154 is less than the energy storage capacity of the energy storage device, a present charge rate for the energy storage device can be set at a first charge rate at 162. The first charge rate can correspond, for example, to a predetermined maximum charge rate for an energy storage system. Such a predetermined maximum charge rate can correspond to a rated maximum level established by the manufacturer of the energy storage device/system. Even though higher charge rates can potentially lead to faster degradation of an energy storage device, using a maximum charge rate at 162 helps reduce potential under-utilization of an energy storage device by storing as much energy as possible before a next dispatch time.

At 164, a present charge rate is set at a second charge rate less than the first charge rate from 162 when the available amount (AA) of energy determined at 154 is greater than the energy storage capacity of the energy storage device. This helps ensure that an energy storage device spends a shorter amount of time at top of charge (TOC) before a dispatch time instead of charging the device as quickly as possible and then curtailing the extra available energy. In some examples, the second charge rate is determined to be a charge rate that would result in the available amount (AA) of energy determined at 154 being stored in the energy storage device by the target time (e.g., just before a scheduled dispatch time). Although the present disclosure describes first and second charge rates, it should be appreciated that still further charge rates can be set in order to achieve the objectives described herein. Although charge rates can be set at fixed levels for various increments of time, continuously varying charge rates can also be used to achieve such objectives.

At 166, method 150 optionally includes controlling a start time for charging the energy storage device. The start time controlled at 166 can be determined based at least in part on one or more factors, including but not limited to the present charge rate, the target time, limiting effect of resistance of the energy storage device and/or economic impact of storage device efficiency. Delaying charging start time can be another way to reduce the amount of time that an energy storage device remains at a TOC energy level before a dispatch time when the energy storage device is discharged. Given a particular target time for reaching TOC, the charging start time can be controlled while a charge rate remains constant. In other examples, both the charging start time and charge rate can be controlled in a manner that effectively balances degradation factors as disclosed herein, including reducing time spent at TOC and using slower charge rates when available amounts of energy exceed storage capacity of an energy storage device.

As shown at 168, method 150 also can include repeating selected steps in predetermined increments of time. In one example, determining at 152 an estimated energy production prediction, determining at 154 an available amount of energy, comparing at 160 the available amount of energy to an energy storage capacity of the energy storage device and controlling at 162/164 the present charge rate to be a first or second charge rate can be repeated in predetermined increments of time. When 156, 158 and/or 166 are also included in method 150, they can also be repeated in predetermined increments of time. In some examples, they are repeated at 168 in one minute intervals.

Figure 4:
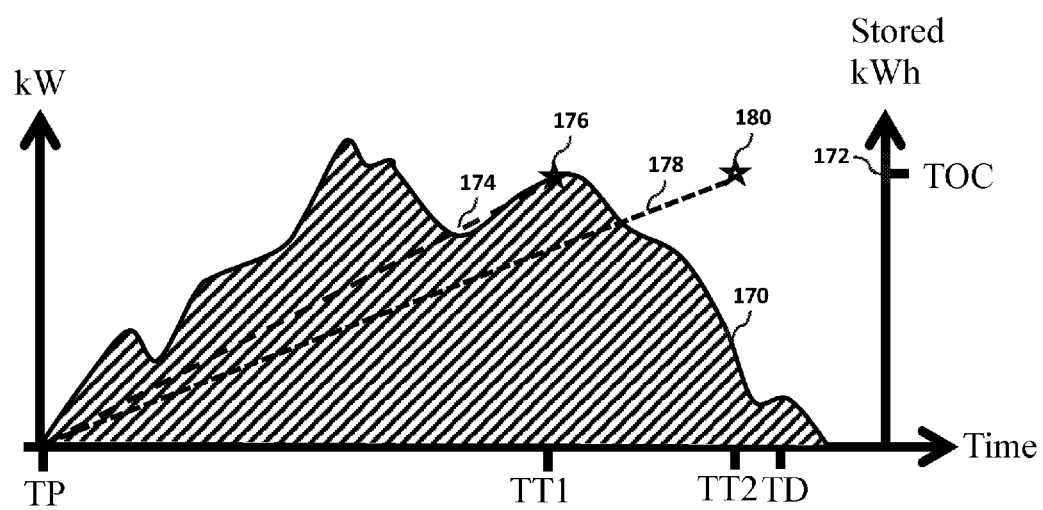
FIG. 4 provides a graphical depiction of the charge rate and time spent at top of charge (TOC) in example energy storage systems with and without charge control features according to example embodiments of the present disclosure.

Referring now to FIG. 4, an example graph depicts advantages of the disclosed embodiments. FIG. 4 plots energy in kilowatts (kW) over time in the form of curve 170, which represents an estimated energy production prediction such as determined at 152 of FIG. 3. An amount of energy in stored kilowatt-hours (kWh) that maximizes the capacity of an energy storage device is depicted at amount 172 to correspond with a top of charge (TOC) energy level. In a first instance of charging an energy storage device depicted by line 174, an energy storage device is charged from a start time or present time (TP) to a first target time (TT1) at a charge rate determined without considering degradation factors. The star 176 on line 174 represents the time at which an energy storage device reaches TOC, corresponding to target time (TT1) and occurring before a predetermined dispatch time (TD). In a second instance depicted by line 178, an energy storage device is charged from a start time or present time (TP) to a second target time (TT2) at a charge rate determined by considering degradation factors as disclosed herein. The star 180 on line 178 represents the point at which an energy storage device reaches TOC, corresponding to target time (TT2) and occurring before a predetermined dispatch time (TD).

Referring still to FIG. 4, the charge rates for energy storage instances represented by lines 174 and 178 correspond to the slopes of the lines, from which it is noted that charge instance 174 has a greater charge rate than charge instance 178. The amount of time spent at a TOC energy level for charge instance 174 represented by the difference between dispatch time (TD) and first target time (TT1) is also longer than the amount of time spent at TOC for charge instance 178 represented by the difference between dispatch time (TD) and second target time (TT2). For charge instance 178 that employs features disclosed herein, the amount of time spent at TOC is reduced as well as the charge rate, both of which contribute to increased efficiency, reduced degradation and extended lifespan of an energy storage device. As depicted in the graph of FIG. 4, this can be done by effectively determining and controlling factors including one or more of the start/present charging time, a target time selected before a dispatch time at which the device will reach TOC, a duration of time between the start and target times, a charge rate for the charging period of time, and the like.

Figure 5:
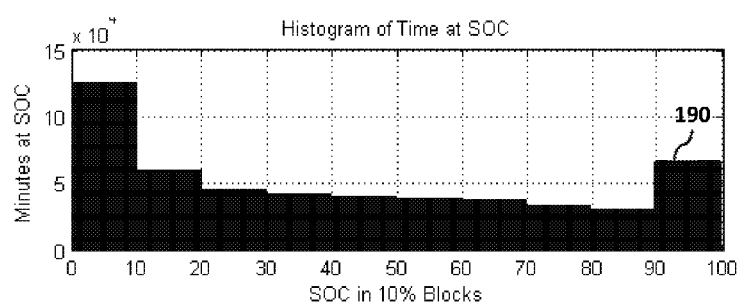
FIG. 5 provides a graphical depiction of the time at state of charge (SOC) for different SOC levels when operating an example energy storage system without charge management features according to example embodiments of the present disclosure.
Figure 6:
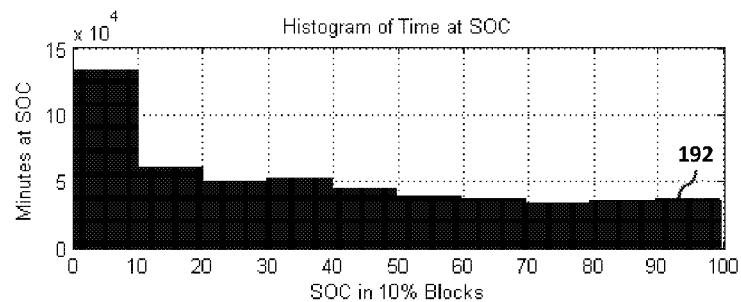
FIG. 6 provides a graphical depiction of the time at state of charge (SOC) for different SOC levels when operating an example energy storage system with charge management features according to example embodiments of the present disclosure.

A comparison of FIGS. 5 and 6 provides another example of advantages achieved in accordance with the disclosed techniques. FIG. 5 provides a histogram of time spent at different state of charge (SOC) levels broken into 10% blocks when operating an example energy storage system without charge management features according to the present disclosure. FIG. 6 provides a histogram of time spent at different state of charge (SOC) levels broken into 10% blocks when operating an example energy storage system with charge management features according to the present disclosure. The amount of time spent at a top of charge (TOC) energy level is encompassed within the highest 10% block of FIGS. 5 and 6, namely the SOC block between 90 and 100 percent charged. It is seen that by employing techniques herein, the number of minutes spent within the highest SOC block 190 of FIG. 5 without using charge control techniques as disclosed herein can be reduced as shown at block 192 of FIG. 6 by reducing time spent at TOC. In one particular simulation, time spent at TOC in a given day was reduced from 1.6 hours per day to 0.1 hours per day by employing the disclosed techniques of determining charge rate and/or charging start time to reduce time at TOC.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling the charge of an energy storage device, the method comprising:
    determining an estimated energy production prediction for an energy source from a present time to a target time, wherein the target time is a time by which an energy storage device is desired to reach a top of charge (TOC) energy level when being charged by the energy source;
    determining an available amount of energy for storage at the energy storage device when the energy storage device is charged from the estimated energy production of the energy source at a first charge rate from the present time until the target time;
    comparing the available amount of energy to an energy storage capacity of the energy storage device;
    controlling a present charge rate for the energy storage device to be the first charge rate when the available amount of energy is less than the energy storage capacity of the energy storage device; and
    controlling a present charge rate for the energy storage device to be a second charge rate when the available amount of energy is greater than the energy storage capacity of the energy storage device, wherein the second charge rate is less than the first charge rate.

2. The method of claim 1, further comprising controlling a start time for charging the energy storage device, wherein the start time is selected as a time between the present time and the target time that is selected based at least in part on one or more of the present charge rate and the target time.

3. The method of claim 2, further comprising determining a limiting effect of a resistance of the energy storage device on charge rates of the energy storage device, and wherein one or more of the second charge rate and the start time is determined based at least in part on the resistance of the energy storage device.

4. The method of claim 2, further comprising determining an economic impact factor related to reduction in battery efficiency, and wherein one or more of the second charge rate and the start time is determined based at least in part on the economic impact factor.

5. The method of claim 1, wherein the target time is before a planned dispatch time for the energy storage device and is selected to limit the total time between the target time and dispatch time during which the energy storage device remains at the top of charge (TOC) energy level.

6. The method of claim 1, wherein the second charge rate is determined as a charge rate that would result in the available amount of energy being stored in the energy storage device by the target time.

7. The method of claim 1, wherein the first charge rate is a predetermined maximum charge rate for the energy storage system.

8. The method of claim 1, further comprising repeating the determining an estimated energy production prediction, the determining an available amount of energy, the comparing the available amount of energy to an energy storage capacity of the energy storage device and the controlling the present charge rate to be a first or second charge rate in predetermined increments of time.

9. The method of claim 1, wherein the energy storage device is a battery, and wherein the energy source is one of a solar energy source or a wind energy source.

10. A system comprising:
    an energy storage device configured to store power from a renewable energy source; and
    a charge controller in communication with the energy storage device and configured to:
        determine an estimated energy production prediction for the renewable energy source from a present time to a target time, wherein the target time is a time by which the energy storage device is desired to reach a top of charge (TOC) energy level when being charged by the energy source;
        determine an available amount of energy for storage at the energy storage device if the energy storage device is charged from estimated energy production of the energy source at a first charge rate from the present time until the target time;
        compare the available amount of energy to an energy storage capacity of the energy storage device;
        control a present charge rate for the energy storage device to be the first charge rate when the available amount of energy is less than the energy storage capacity of the energy storage device; and
        control a present charge rate for the energy storage device to be a second charge rate when the available amount of energy is greater than the energy storage capacity of the energy storage device, wherein the second charge rate is less than the first charge rate.

11. The system of claim 10, wherein the charge controller is further configured to control a start time for charging the energy storage device, wherein the start time is selected as a time between the present time and the target time that is selected based at least in part on one or more of the present charge rate and the target time.

12. The system of claim 11, wherein the charge controller is further configured to determine a limiting effect of the resistance of the energy storage device on charge rates of the energy storage device, and wherein one or more of the second charge rate and the start time is determined based at least in part on the resistance of the energy storage device.

13. The system of claim 11, wherein the charge controller is further configured to determine an economic impact factor related to reduction in battery efficiency, and wherein one or more of the second charge rate and the start time is determined based at least in part on the economic impact factor.

14. The system of claim 10, wherein the target time is before a planned dispatch time for the energy storage device and is selected to limit the total time between the target time and dispatch time during which the energy storage device remains at the top of charge (TOC) energy level.

15. The system of claim 10, wherein the second charge rate is determined as a charge rate that would result in the available amount of energy being stored in the energy storage device by the target time.

16. The system of claim 10, wherein the first charge rate is a predetermined maximum charge rate for the energy storage system.

17. The system of claim 10, wherein the charge controller is further configured to repeat the determining an estimated energy production prediction, the determining an available amount of energy, the comparing the available amount of energy to an energy storage capacity of the energy storage device and the controlling the present charge rate to be a first or second charge rate in predetermined increments of time.

18. The system of claim 1, wherein the energy storage device is a lithium battery.

19. The system of claim 1, further comprising a renewable energy source, and wherein the renewable energy source comprises one of a solar energy source or a wind energy source.

20. A method for generating power, comprising:
charging an energy storage device from an energy source;
determining an estimated energy production prediction for the energy source from a present time to a target time, wherein the target time is a time by which the energy storage device is desired to reach a top of charge (TOC) energy level when being charged by the energy source;
determining an available amount of energy for storage at the energy storage device if the energy storage device is charged from the estimated energy production of the energy source at a first charge rate from the present time until the target time;
comparing the available amount of energy to an energy storage capacity of the energy storage device;
controlling a present charge rate for the energy storage device to be the first charge rate when the available amount of energy is less than the energy storage capacity of the energy storage device; and
controlling a present charge rate for the energy storage device to be a second charge rate when the available amount of energy is greater than the energy storage capacity of the energy storage device, wherein the second charge rate is less than the first charge rate.

* * * * *